US011977669B2

(12) United States Patent
Morrison et al.

(10) Patent No.: US 11,977,669 B2
(45) Date of Patent: May 7, 2024

(54) SECURITY LOCK SOLUTION USING THE USB-C OPENING

(71) Applicant: Dell Products L.P., Round Rock, TX (US)

(72) Inventors: Jason Scott Morrison, Chadron, NE (US); Nicholas D. Grobelny, Evergreen, CO (US); Mark Andrew Schwager, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 193 days.

(21) Appl. No.: 17/667,938

(22) Filed: Feb. 9, 2022

(65) Prior Publication Data

US 2023/0252193 A1 Aug. 10, 2023

(51) Int. Cl.
  *G06F 21/86* (2013.01)
  *G06F 1/16* (2006.01)
  *G06F 21/82* (2013.01)

(52) U.S. Cl.
  CPC ............ *G06F 21/86* (2013.01); *G06F 1/1658* (2013.01); *G06F 21/82* (2013.01)

(58) Field of Classification Search
  CPC .......... G06F 21/71; G06F 21/82; G06F 21/85; G06F 21/86; G06F 1/1658
  See application file for complete search history.

(56) References Cited

U.S. PATENT DOCUMENTS

| 8,408,932 | B2 | 4/2013 | Villarreal et al. |
| 10,690,326 | B2* | 6/2020 | Baker ..................... F21V 21/34 |
| 11,342,800 | B2* | 5/2022 | Oro ........................... H02J 7/02 |
| 11,641,076 | B2* | 5/2023 | Avganim ............. H01R 13/434 |
| | | | 439/344 |
| 2012/0295462 | A1 | 11/2012 | Villarreal et al. |

OTHER PUBLICATIONS

U.S. Appl. No. 18/178,181, filed Feb. 9, 2023.*

* cited by examiner

*Primary Examiner* — Hosuk Song
(74) *Attorney, Agent, or Firm* — Womble Bond Dickinson (US) LLP

(57) ABSTRACT

Methods and systems for securing data processing systems are disclosed. A data processing system may be operably connected to other devices via ports. When operably connected, some devices connected via the ports may cause undesired actions to be performed. To limit physical access to the ports, a security apparatus may be used to lock the ports. The security apparatus may transition between states where it may be inserted into openings for the ports and may be locked to the openings for the ports. When so locked, physical access to the ports may be limited.

20 Claims, 14 Drawing Sheets

SECURITY LOCK SOLUTION USING THE USB-C OPENING

FIELD OF THE EMBODIMENTS

Embodiments disclosed herein relate generally to device security. More particularly, embodiments disclosed herein relate to systems and methods to physical port access.

BACKGROUND

Computing devices may store data and use stored data. For example, computing devices may utilize data when providing computer implemented services. The computing device may also use computing resources to provide the computer implemented services. The computing resources of computing devices may be expanded using devices connected via one or more ports.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1:
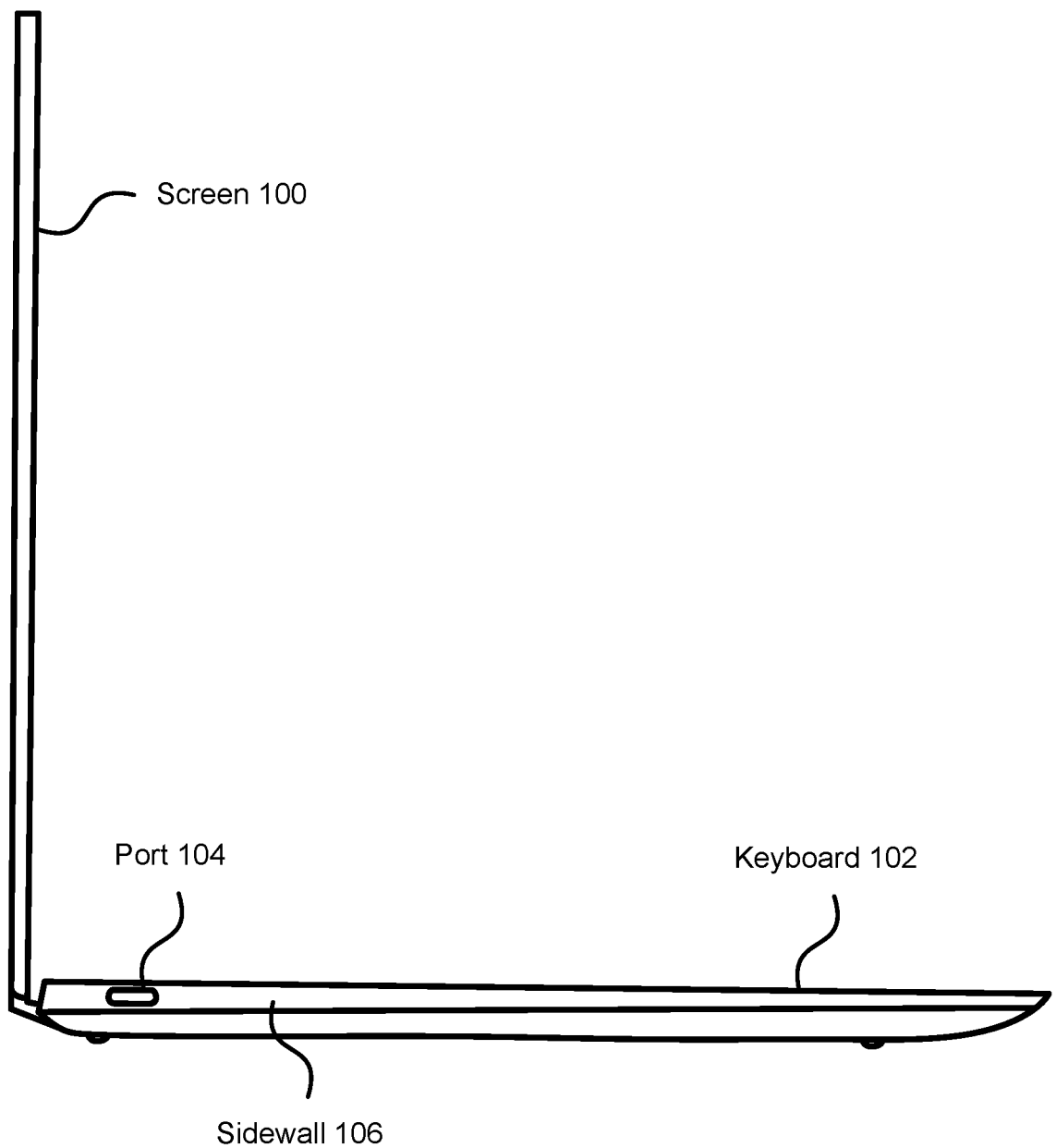
FIG. 1 shows a block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for security of data processing systems. A data processing system may include a computing device that may provide computer implemented services. The computer implemented services provided by the data processing system may be limited based on the components available to the data processing system.

To change the components available to the data processing system, various devices may be operably connected to the hardware components of the data processing system via one or more ports. The ports may facilitate formation of operable connections between external components and the hardware components of the data processing system.

However, the ports may present avenues of attack. For example, various devices may be connected to the ports that may impair the functionality of the data processing system, may attempt to gain access to sensitive data, and/or may perform other types of undesirable actions using the ports.

Additionally, data processing systems may be relatively light weight and easily movable structures of high value. Consequently, there may be few inherent impediments to theft of data processing systems.

To improve the security of data processing systems, a security apparatus may be used. The security apparatus may limit physical access to the ports and/or may reduce the susceptibility of data processing systems to theft. The security apparatus may do so by locking itself to openings in an enclosure corresponding to the ports. When so locked in place, physical access to the ports may be prevented. Additionally, the security apparatus may be reversibly attached to nearby objects thereby anchoring (e.g., tethering, securing, etc.) the data processing systems to the nearby objects.

Doing so may reduce the susceptibility of data processing systems to theft by preventing (or impeding) movement of the data processing systems.

In an embodiment, the ports are universal serial bus type C ports. Such ports may generally have a small form factor and have a smaller opening in an enclosure. The security apparatus may include a reversible interference mechanism that may transition between two configurations. In a first configuration, the size of the reversible interference mechanism may be reduced thereby allowing for insertion of a portion of it into an opening in an enclosure. In the second configuration, the size of the reversible interference mechanism may be increased thereby preventing removal of the portion of the reversible interference mechanism from the opening. In this manner. The openings in the enclosure corresponding to ports may be selectively sealed and the security apparatus may be reversibly physically attached to the data processing systems.

In an embodiment, a security apparatus to secure a port of a data processing system is provided. The security apparatus may include a body; a reversible interference mechanism extending from the body; and an actuator, coupled to the reversible interference mechanism, adapted to actuate the reversible interference mechanism between two configurations, in a first of the two configurations the reversible interference mechanism has a cross section that allows a portion of the reversible interference mechanism to traverse through an opening of a type C universal serial bus port, in a second of the two configurations the reversible interference mechanism has a cross section that disallows the portion of the reversible interference mechanism from traversing through the opening of the type C universal serial bus port, and the body being locked to the type C universal serial bus port while the portion of the reversible interference mechanism is in the type C universal serial bus port and in the second of the two configurations.

The reversible interference mechanism may include an extension member that extends away from the body; and an offset member positioned with an end of the extension member that is positioned away from the body, the offset member having a larger cross section than the extension member.

The reversible interference mechanism may include two pairs of the extension member and the offset member.

Each of the two pairs may be separately coupled to the actuator.

The actuator may actuate the reversible interference mechanism by rotating the extension member of each of the two pairs about a length of the respective extension member.

The offset member may include a bar with a first end attached to the extension member and a second end that extends away from the length of the extension member.

The extension member of each of the pairs may be positioned with respect to one another so that both extension members of the pairs may traverse through the type C universal serial bus opening regardless of which of the two configurations the reversible interference mechanism is positioned.

The actuator may actuate the reversible interference mechanism by translating the extension member of each of the two pairs.

The offset member may include a bar with a first end attached to the extension member and a second end that extends away from a length of the extension member.

The extension member of each of the pairs is positioned with respect to one another so that both extension members of the pairs may traverse through the type C universal serial bus opening while translated toward one another.

In an embodiment, a data processing system that includes a security apparatus is provided.

Turning to FIG. 1, a diagram of a data processing system is shown. The data processing system may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 4.

In FIG. 1, the data processing system is illustrated as being a laptop computer (e.g., a side view). However, the data processing system may be implemented with other types of computing devices without departing from embodiments disclosed herein.

The data processing system may provide any quantity and type of computer implemented services. The computer implemented services may include, for example, database services, instant messaging services, video conferencing services, and/or any other types of services that may be provided by data processing systems. These services may result in sensitive information being stored in the data processing systems. Consequently, theft of the data processing system may result in both financial lost due to the value of the data processing systems but also legal liability exposure due to potential exposure of the sensitive information.

To provide these services, the data processing system may include screen 100 for displaying information to a user and keyboard 102 for allowing a user to input information. The data processing system may also include various hardware components such as processors, memory modules, etc.

The type and quantity of computer implemented services may be limited based on the types of hardware devices accessible by the data processing system. To allow various types of services to be implemented, the data processing system may be extensible. For example, various hardware components may be operably connected to the data processing system. These hardware components may interact with various computing resources (e.g., processors, memory modules, storage devices, etc.) of the data processing system.

To facilitate such interactions, the data processing system may include various ports through which operable connections may be formed. For example, the data processing system may include port 104 positioned on a sidewall 106 of an enclosure in which the computing resources of the data processing system are housed. Port 104 may allow for operable connections to be formed between components external to the enclosure and the computing resources positioned there.

Port 104 may be implemented with various types of communication technologies. For example, port 104 may be implemented with a type C universal serial bus (USB) port.

However, port 104 may generally be exposed to an external environment. Consequently, port 104 may present a threat to the computing resources of the data processing system. Parties may utilize port 104 to gain access to the computing resources. While some precautions may be taken (e.g., software meant to identify and/or prevent attacks via ports), these precautions may not always be successful.

To form an operable connection to the computing resources of the data processing system, a plug or other electrical connector may need to be inserted into port 104.

If a plug cannot be inserted into port 104, then the computing resources may be safe from threats that may attempt to utilize port 104.

Figure 2A:
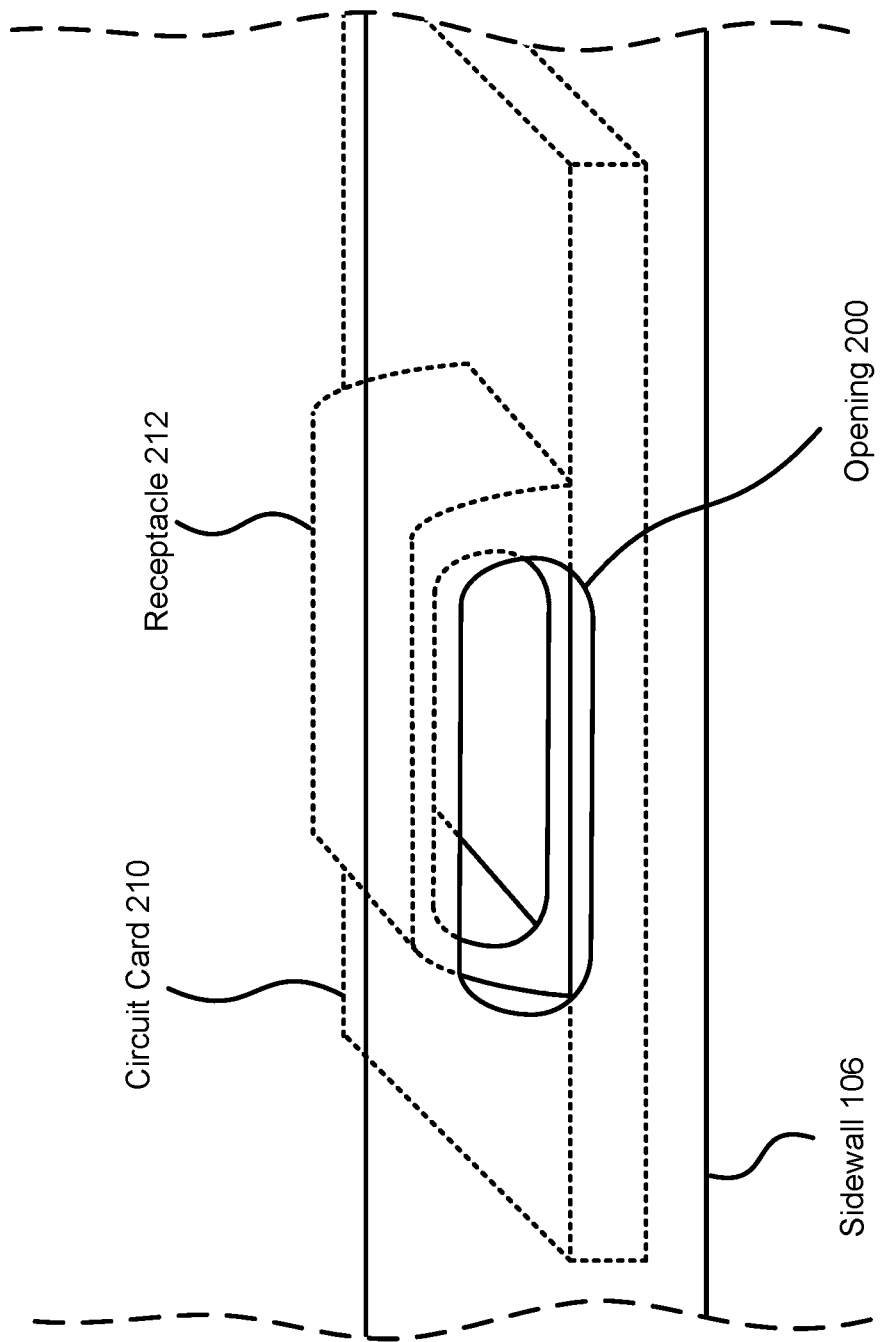
FIG. 2A shows a block diagram illustrating a port topology of a data processing system in accordance with an embodiment.

For example, turning to FIG. 2A, a diagram of a data processing system in accordance with an embodiment is shown. In FIG. 2A, portions of a circuit card 210 and receptacle 212 that may be obscured from view behind sidewall 106 and other portions of an enclosure are illustrated with dashed lines.

To facilitate operable connections between computing resources and other devices, data processing system may include receptacle 212 positioned on circuit card 210. Circuit card 210 may include electrical traces interconnecting receptacle 212 and the computing resources.

Receptacle 212 may be a receptacle for plugs or other types of devices. Receptacle 212 may be positioned with opening 200 such that when plugs are inserted through opening 200, electrical connections between the plugs and receptacle 212 are made. The electrical connections may facilitate operable connections (e.g., communication connections) between the computing resources in the data processing system and a device that is external to the data processing system.

Figure 2B:
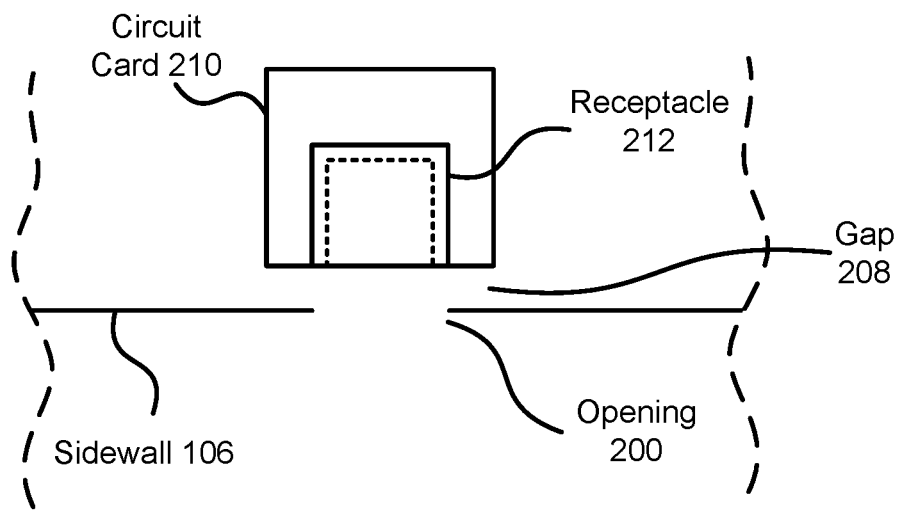
FIG. 2B shows a top view diagram illustrating a port topology of a data processing system in accordance with an embodiment.
Figure 2C:
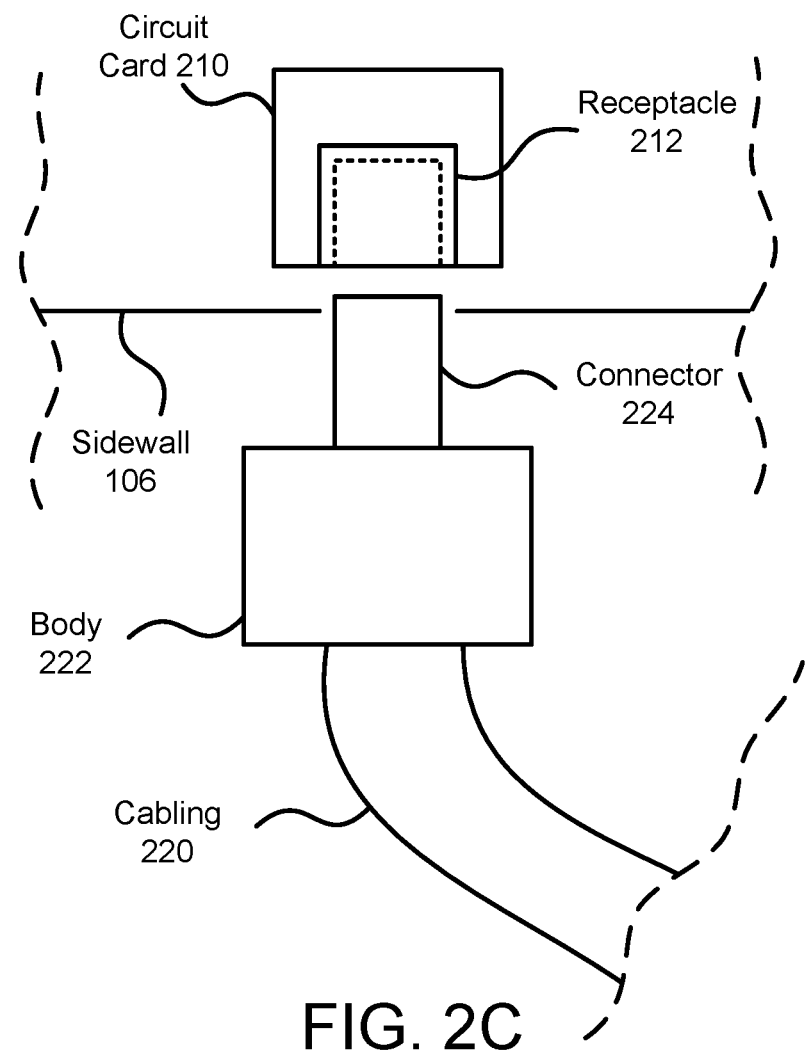
FIG. 2C shows a top view diagram illustrating a port topology of a data processing system and a plug in accordance with an embodiment.
Figure 2D:
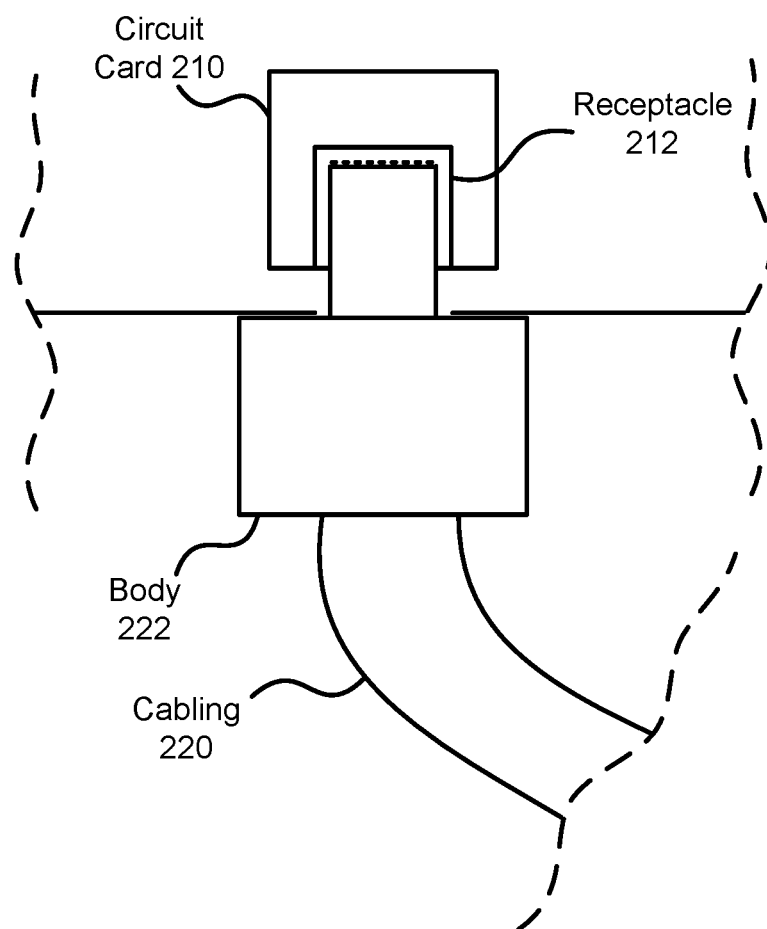
FIG. 2D shows a top view diagram illustrating a plug connected to a port topology of a data processing system in accordance with an embodiment.

For example, turning to FIGS. 2B-2D which each may illustrate a top view diagram similar to that illustrated in FIG. 2A in accordance with an embodiment, a plug may include cabling 220 which may be used to form an electrical connection with a connector 224 (e.g., which may be physically connected via body 222 which may serve as a grip point for a person). Connector 224 may have a shape and size complementary to opening 200 and receptacle 212 such that connector 224 may form electrical connections with receptacle 212.

To form the connection, as shown in FIG. 2C, connector 224 may be aligned with opening 200. Once aligned, connector 224 may be inserted into opening 200 thereby causing connector 224 to make physical contact with receptacle 212, as illustrated in FIG. 2D.

However, as noted above, opening 200 may be used by unauthorized parties to attempt to access computing resources of the data processing system. For example, opening 200 may be compliant with a standard thereby allowing various types of devices to be operably connected via opening 200 and receptacle 212. Further, if the data processing system is stolen, then the unauthorized parties may have substantial access to the information included in the data processing system.

In general, embodiments disclosed herein relate to methods, systems, and devices for improving the security of data processing systems. To improve the security of data processing systems, a system may include a data processing system and a security apparatus. The security apparatus may be usable to limit access to ports of the data processing system and/or reduce the susceptibility of the data processing systems to theft.

In an embodiment, the security apparatus includes functionality to reversibly lock itself to a port of the data processing system. When locked to the port of the data processing system, physical access to the port may be prevented. Additionally, the security apparatus may also include functionality to lock (or otherwise anchor) itself to other structures. For example, the security apparatus may include a security cable that may be attached to structures in a local environment such as a table. The security cable and security apparatus may prevent (or impede) the security apparatus from being substantially moved. Consequently, the data processing system may be less likely to be subject to theft due to movement away from a user, person, and/or general location. For additional details regarding security cables and anchoring using a security apparatus, refer to FIGS. 3M-3N.

To lock itself to the port, the security apparatus may include a reversible interference mechanism. The reversible interference mechanism may be actuated between two configurations. In a first configuration, the reversible interference mechanism 310 may have a shape that allows a portion of it to be inserted through openings of enclosures of the data processing system corresponding to ports. In a second configuration, the reversible interference mechanism 310 may have a shape that prevents the portion of it to be removed from the openings of enclosures of the data processing system corresponding to ports.

The reversible interference mechanism 310 may be coupled to an actuator that facilitates transition between the two configuration. The actuator may be driven by a security component such as a key or other structure. For example, the actuator may be coupled to a cylinder of a lock core. When a key is inserted in the lock core, the cylinder may rotate between two positions. The rotation of the cylinder may cause the actuator to corresponding actuate the reversible interference mechanism 310 to transition from the first to the second configuration, and/or the reverse.

Figure 3A:
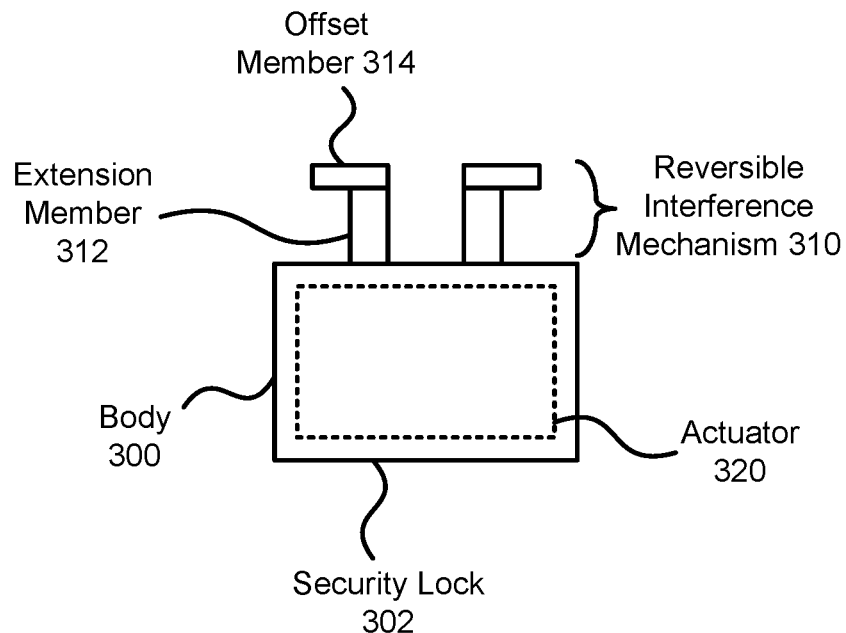
FIG. 3A shows a block diagram illustrating a security apparatus in accordance with an embodiment.

Turning to FIG. 3A, a block diagram of a security apparatus in accordance with an embodiment is shown. The security apparatus may include a body 300 and a reversible interference mechanism 310.

Body 300 may be implemented with a physical structure such as an enclosure. Body 300 may house actuator 320 and a lock cylinder (not shown) or other structure for limiting actuation of actuator 320. In FIG. 3A, actuator 320 is drawn in dashing to indicate that it is obscured from view in the figure.

In an embodiment, body 300 has a shape and size that is larger than an opening for a port which the security apparatus is adapted to secure. When the security apparatus is positioned with the opening, body 300 may generally prevent physical access to the opening and component within an enclosure of a data processing system which may be accessed via the opening.

Actuator 320 may be mechanically coupled to reversible interference mechanism 310. Actuator 320 may selectively apply force to the components of reversible interference mechanism 310 to transition between configurations and to maintain the components in the respective configurations. Refer to FIGS. 3I-3L for additional details regarding actuator 320.

Reversible interference mechanism 310 may be implemented with one or more physical structures usable to reversibly lock the security apparatus to ports of a data processing system. Reversible interference mechanism may include one or more extension members (e.g., 312) and one or more offset members (e.g., 314). In an embodiment, reversible interference mechanism 310 is implemented with two pairs of extension member 312 and offset member 314.

Extension member 312 may be implemented with a physical structure. For example, extension member 312 may be implemented with a cylindrical member that extends outward away from body 300. Cylindrical member may extend a distance away from body 300 that is greater than a thickness of an enclosure (e.g., a thickness of a side wall) of a data processing system so that when body 300 is positioned next to an enclosure, offset member 314 may be positioned inside of an opening in the enclosure.

Offset member 314 may be implemented with a physical structure. For example, offset member 314 may be implemented with a bar that is connected to an end of extension member 312 on one side and extends outward (e.g., radially outward) from a length of extension member 312. In FIG. 3A, the length of extension member 312 may be from top to bottom in the figure.

In an embodiment, extension member 312 and offset member 314 are implemented as a unitary structure. Consequently, in an embodiment, reversible interference mechanism 310 is implemented with a pair of the unitary structure.

The positioning of offset member 314 and extension member 312 may be changed by actuator 320. For example, in a first configuration, the offset members of a pair may be positioned so that they are unable to traverse an opening in an enclosure.

Figure 3B:
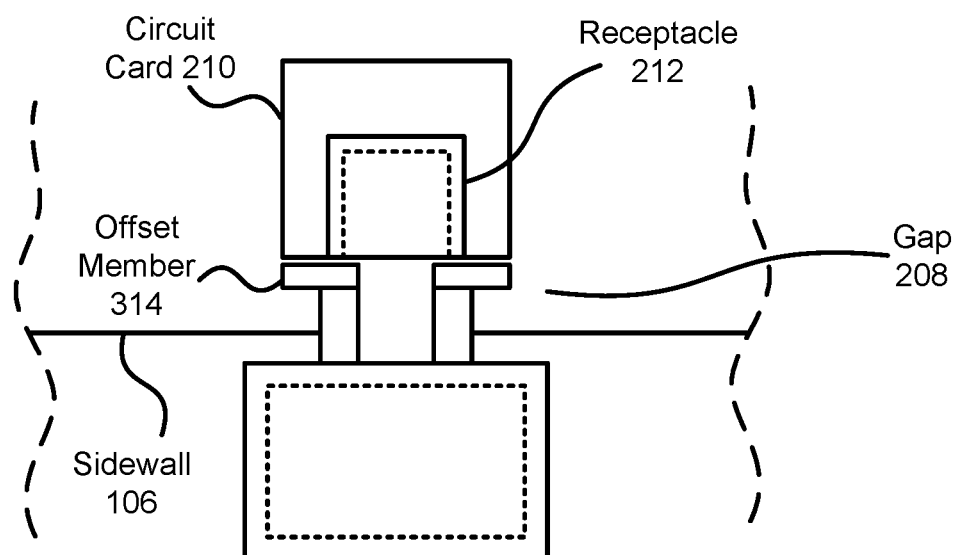
FIG. 3B shows a top view diagram illustrating a security apparatus in a first configuration and a port topology of a data processing system in accordance with an embodiment.

Turning to FIG. 3B, a diagram (e.g., top view) of a security apparatus positioned with a port in accordance with an embodiment is shown. In FIG. 3B, the offset members (e.g., 314) are illustrated in the first configuration (e.g., after being positioned inside of the enclosure).

As seen in FIG. 3B, when so positioned, the offset members may prevent removal of the security apparatus by generating an interference with removal via the opening. For example, if the security apparatus is pulled downward, away from receptacle 212 in FIG. 3B, the offset members 314 may not be pulled out through the opening in sidewall 106. Consequently, the security apparatus may prevent physical access to receptacle 212.

Offset members 314 may generally have a thickness that is smaller than gap 208. Gap 208 may be a space between an interior of an enclosure and receptacle 212. Gap 208 may have a thickness sufficient to allow the thickness of offset members to be large enough to impart resistance against brute force removal attempts. For example, receptacle 212 and/or circuit card 210 may be cut back from nominal dimension to increase gap 208 so that the thickness of offset members may be made sufficient large to impart brute force resistance.

To remove the security apparatus, the actuator may be utilized to change the configuration of reversible interference mechanism 310. For example, a key may be inserted in a locking cylinder and rotated. The rotation of the locking cylinder may cause the actuator to operate thereby changing the configuration of the reversible interference mechanism 310.

Figure 3C:
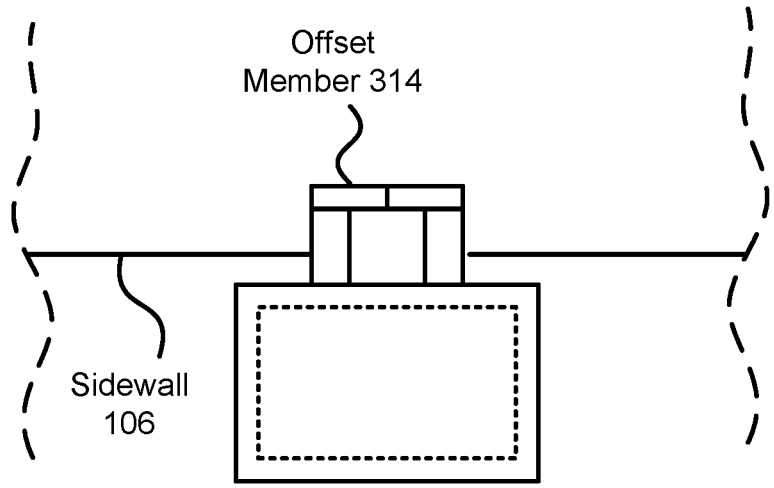
FIG. 3C shows a top view diagram illustrating a security apparatus in a second configuration and a port topology of a data processing system in accordance with an embodiment.

Turning to FIG. 3C, a second diagram (e.g., top view) of a security apparatus positioned with a port in accordance with an embodiment is shown. In FIG. 3C, the offset members (e.g., 314) are illustrated in the second configuration.

As seen in FIG. 3C, offset members 314 have been rotated so that they may pass through the opening in sidewall 106. In this second configuration, the security apparatus may be removed from the port thereby facilitating access to the port.

Generally, the ports may be reversibly locked over time for various security purposes. For example, during periods of travel, the security apparatus may be locked to a port to prevent physical access to the ports. Once the travel is complete, the security apparatus may be unlocked from the port to facilitate physical access to the port. In this manner, the security of the data processing system may be improved.

Figure 3D:
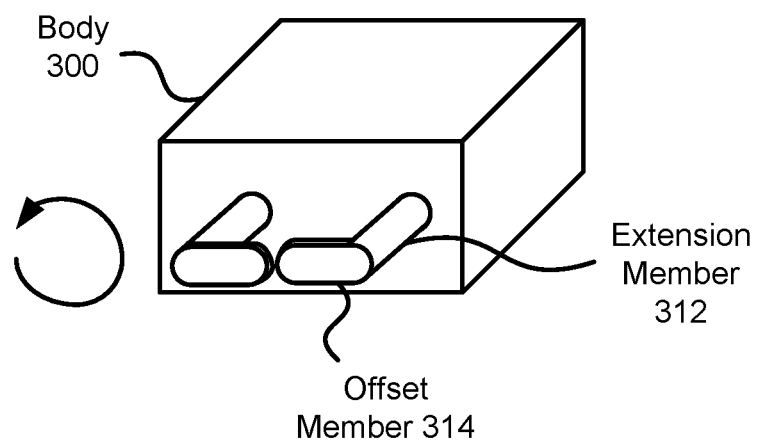
FIG. 3D shows an isometric view diagram illustrating a security apparatus in a second configuration in accordance with an embodiment.
Figure 3E:
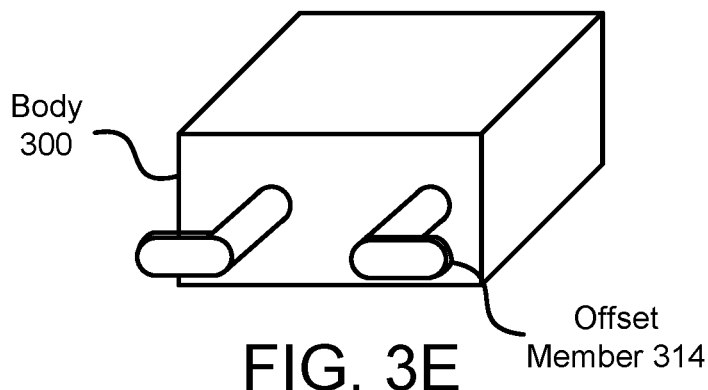
FIG. 3E shows an isometric view diagram illustrating a security apparatus in a first configuration in accordance with an embodiment.

To further clarify aspects of the process of transitioning between configurations, isometrics diagrams of the security apparatus in accordance with an embodiment are shown in FIGS. 3D and 3E. As seen in these figures, in an embodiment, extension members 312 are implemented with cylindrical structures that extend from a surface of body 300. Offset members 314 may be positioned at the end of each of the extension members.

As seen in FIG. 3D, when in a second configuration, the offset members may generally face towards each other thereby reducing a cross section of the face presented by the offset members. In this configuration, the cross section of the face presented by the offset members may be smaller than an opening for a port.

To transition to the first configuration (and/or back to the second configuration), the extension members may be rotated about their length (e.g., into and out of the page in FIG. 3D), as illustrated by the arrow to the left of the security apparatus in FIG. 3D. While showing counter clockwise rotation, the extension members may rotate in a clockwise manner without departing from embodiments disclosed herein. The first configuration may correspond to when the offset members are facing away from one another, as shown in FIG. 3E.

As seen in FIG. 3E, when in the first configuration, the offset members may generally face away from each other thereby increasing a cross section of the face presented by the offset members. In this configuration, the cross section of the face presented by the offset members may be larger than an opening for a port. Consequently, if positioned inside of an enclosure, the offset members may not be able to be removed via an opening for a port.

While described with respect to rotation of the extension members above, embodiments disclosed herein may facilitate transitions between configurations (e.g., unlocked and locked configurations) using other movement patterns. For example, the extension members may be translated to transition between the configurations.

Figure 3F:
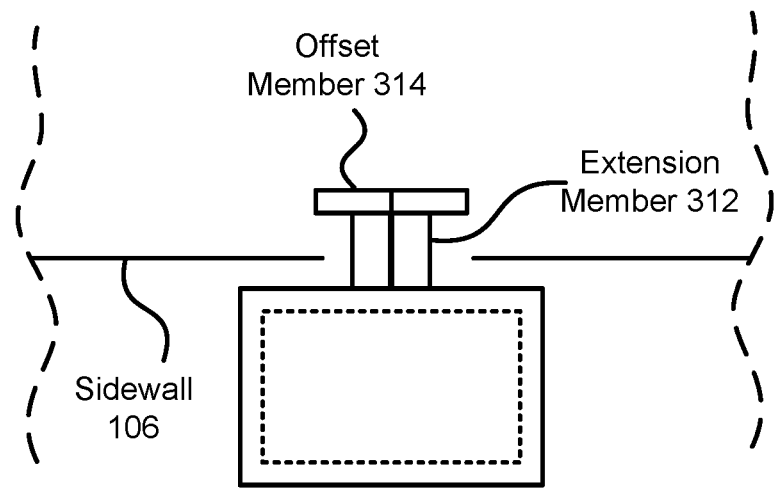
FIG. 3F shows a top view diagram illustrating a security apparatus in a second configuration and a port topology of a data processing system in accordance with an embodiment.

Turning to FIG. 3F, a third diagram (e.g., top view) of a security apparatus positioned with a port in accordance with an embodiment is shown. In FIG. 3F, the offset members (e.g., 314) are illustrated in the second configuration. In contrast to FIG. 3C, the extension members (e.g., 312) are positioned next to one another while in the second configuration.

To transition between the first configuration and the second configuration, the extension members (and corresponding offset members connected to the extension members) may generally translate. For example, the extension members may move towards or away from one another to transition between the configurations. By doing so, the cross section of the face presented by the offset members may generally be increased or decreased, similarly to that described with respect to FIGS. 3A-3E.

Figure 3G:
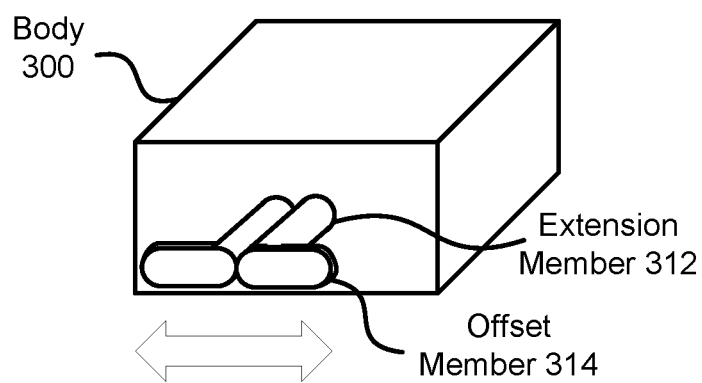
FIG. 3G shows an isometric view diagram illustrating a security apparatus in a second configuration in accordance with an embodiment.
Figure 3H:
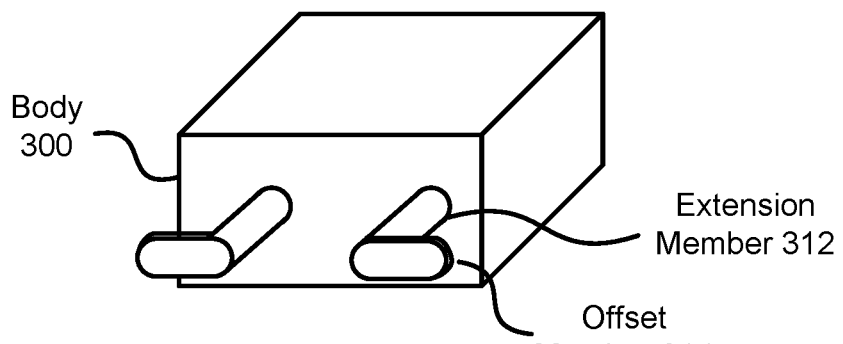
FIG. 3H shows an isometric view diagram illustrating a security apparatus in a first configuration in accordance with an embodiment.

To further clarify aspects of the process of transitioning between configurations using translation, isometrics diagrams of the security apparatus in accordance with an embodiment are shown in FIGS. 3G and 3H. As seen in these figures, in an embodiment, extension members 312 are implemented with cylindrical structures that extend from a surface of body 300. Offset members 314 may be positioned at the end of each of the extension members.

As seen in FIG. 3G, when in a second configuration, the offset members may generally face away from each other but may be positioned closely to one another by virtue of the reduced spacing between the extension members, which may reduce a cross section of the face presented by the offset members. In this configuration (similar that that shown in FIG. 3D), the cross section of the face presented by the offset members may be smaller than an opening for a port.

Figure 3I:
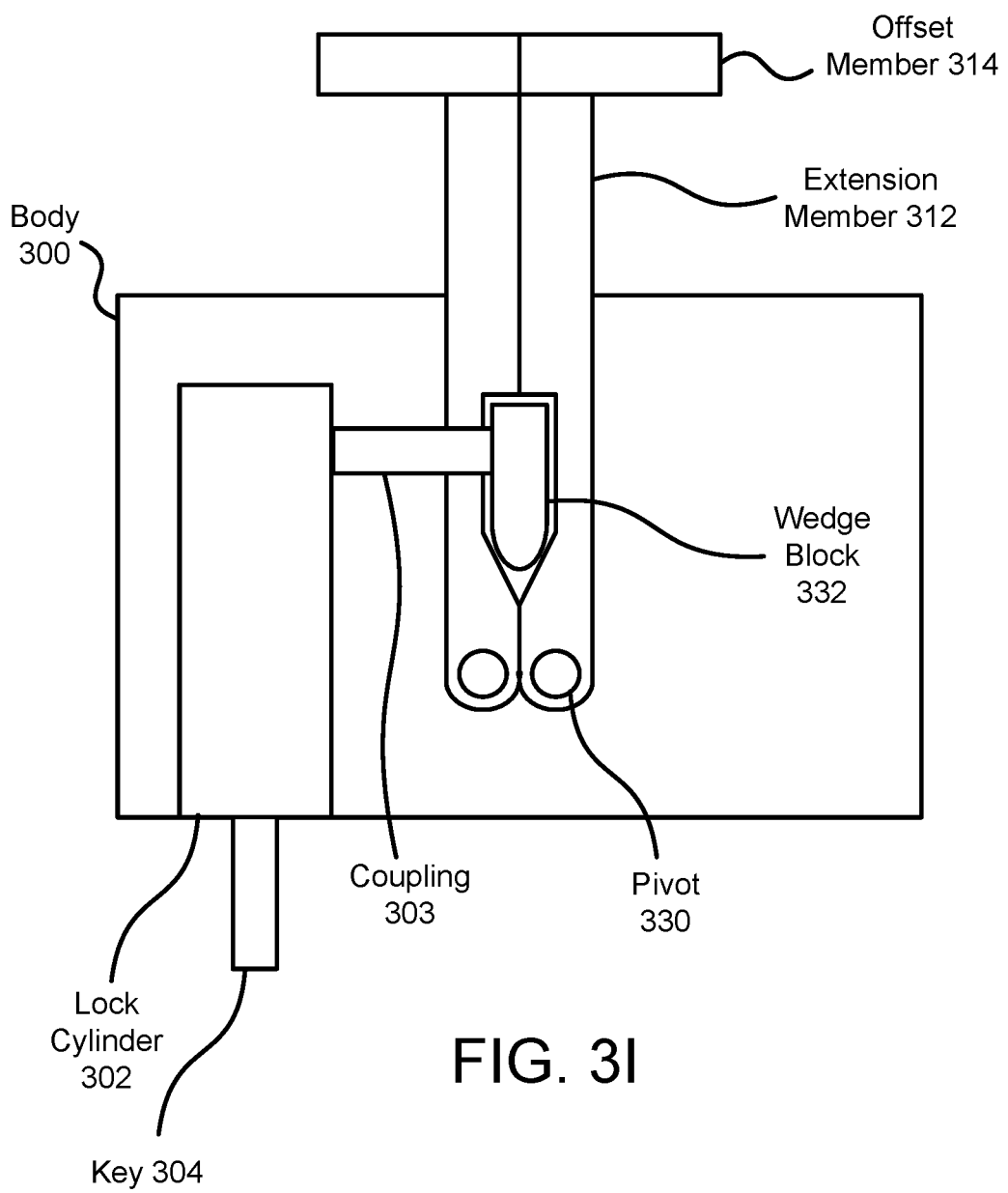
FIG. 3I shows a block diagram illustrating a first actuator and a security apparatus in a second configuration in accordance with an embodiment.
Figure 3J:
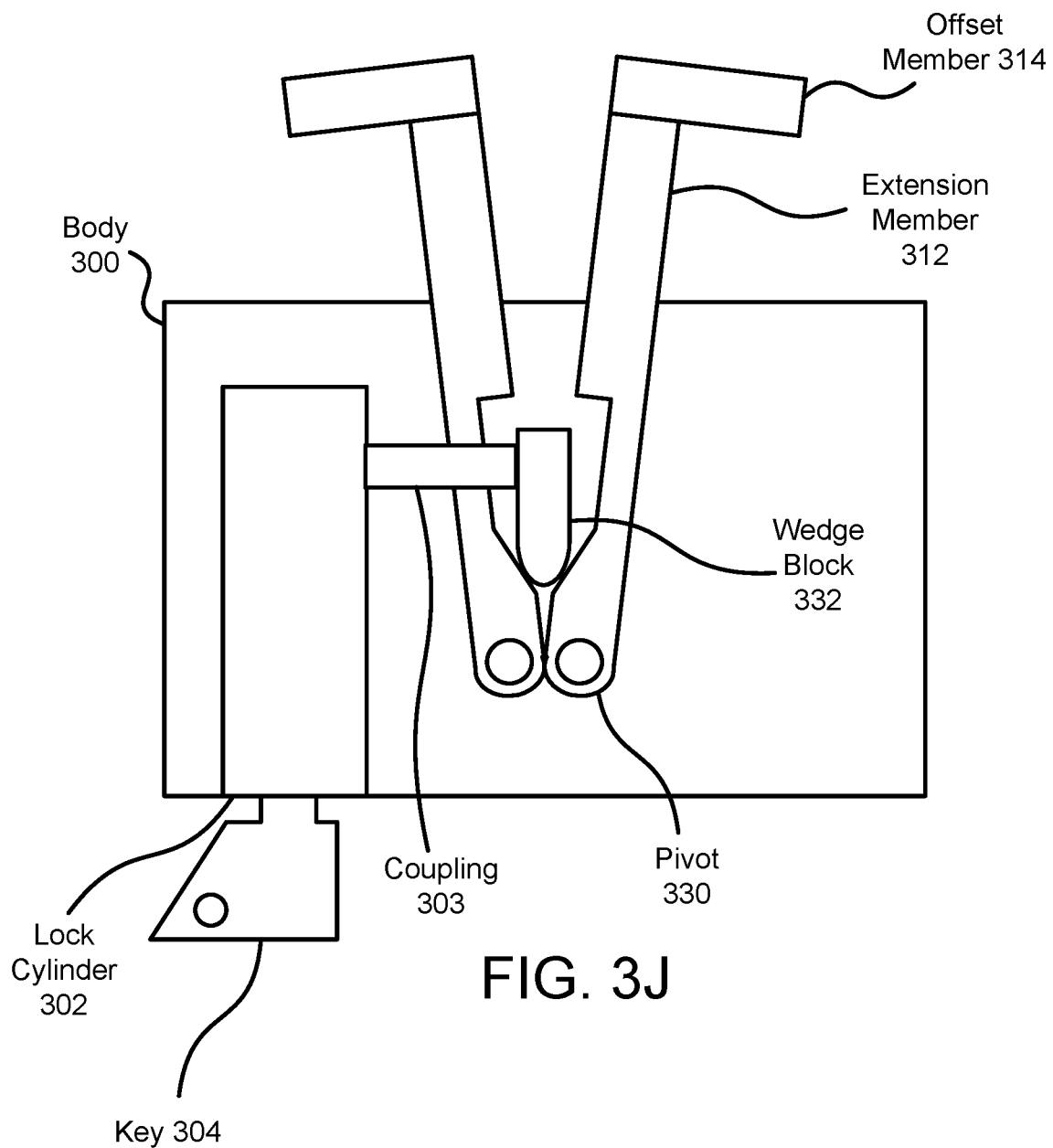
FIG. 3J shows a block diagram illustrating a first actuator and a security apparatus in a first configuration in accordance with an embodiment.

To transition to the first configuration, the extension members may be translated away from one another, as illustrated by the arrow below the security apparatus in FIG. 3G. To reduce the complexity of this motion pattern, a second end of the extension members (not shown) positioned inside of body 300 may be anchored which may cause the extension members to slightly rotate in addition to translate. Refer to FIGS. 3I-3J for additional details regarding combined rotation and translation. The motion pattern may be reversed to transition from the first configuration to the second configuration.

As seen in FIG. 3H, when in the first configuration, the offset members may generally face away from each other and may be separated by an increased spacing of the extension members, thereby increasing a cross section of the face presented by the offset members. In this configuration, the cross section of the face presented by the offset members may be larger than an opening for a port. Consequently, if positioned inside of an enclosure, the offset members may not be able to be removed via an opening for the port.

Figure 3K:
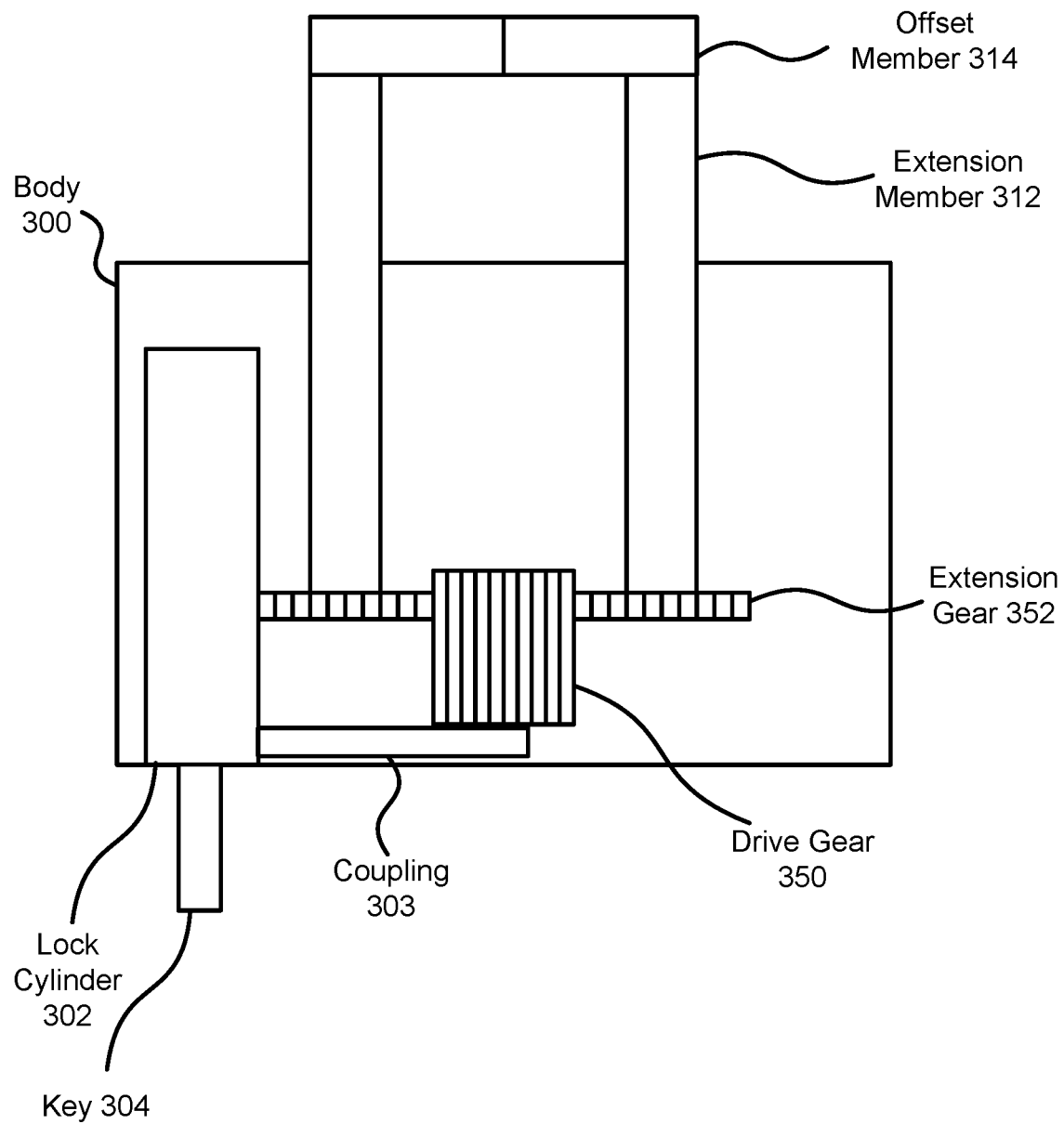
FIG. 3K shows a block diagram illustrating a second actuator and a security apparatus in a second configuration in accordance with an embodiment.
Figure 3L:
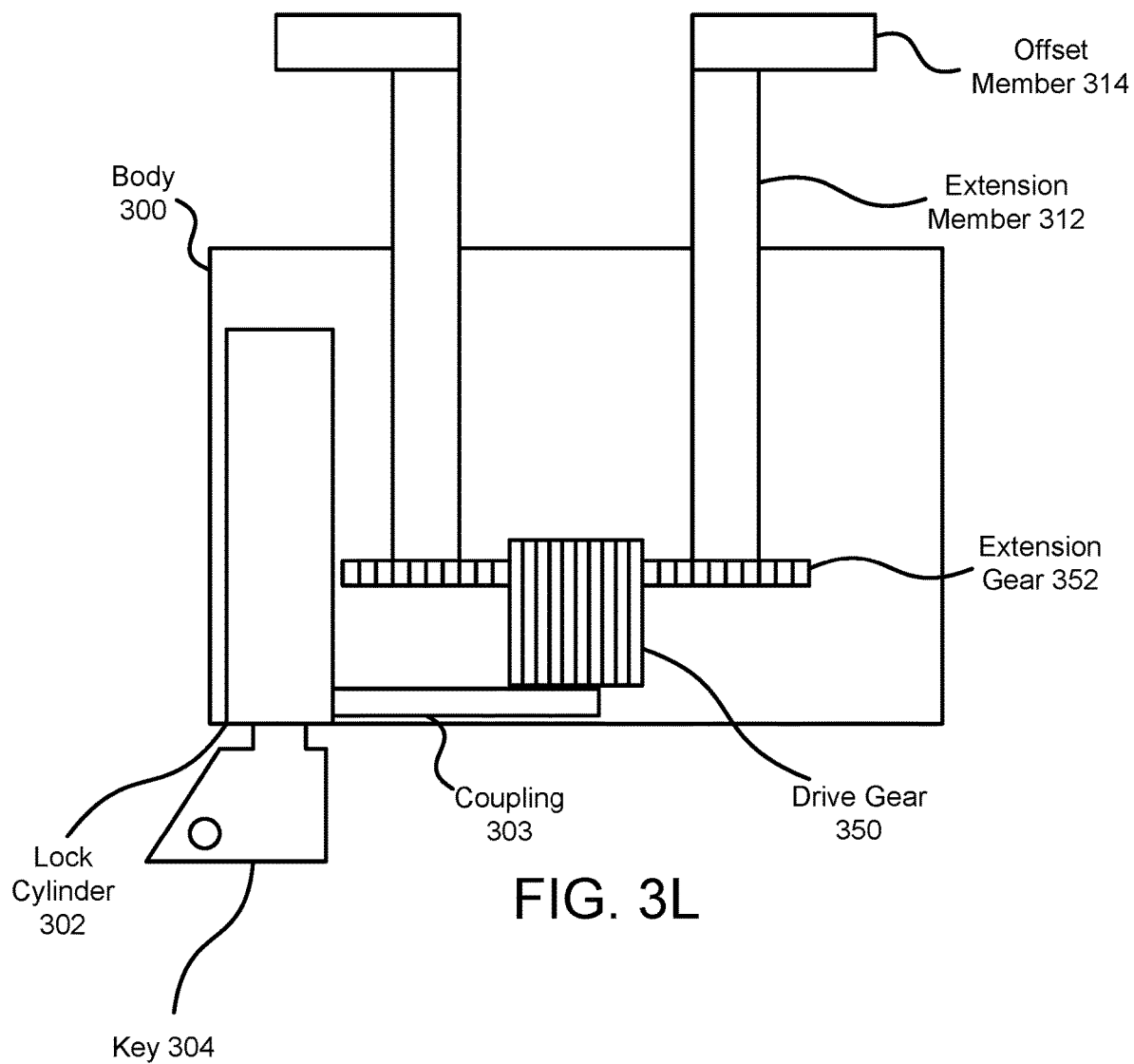
FIG. 3L shows a block diagram illustrating a second actuator and a security apparatus in a first configuration in accordance with an embodiment.

To further clarify embodiments disclosed herein, diagram illustrating actuators of security apparatus in accordance with an embodiment are shown in FIGS. 3I-3L. In FIGS. 3I-3J, diagrams of an actuator that translates (and to some extent rotates) extension members are shown. In FIGS. 3K-3L, diagrams of an actuator that rotates extension members are shown.

Turning to FIGS. 3I-3J, diagrams of a security apparatus is shown. In these figures, the internal components of the actuator are shown even though they may normally be obscured from view by body 300. In FIG. 3I, the reversible interference mechanism is illustrated in a second configuration which allows for insertion and removal of extension members from openings for ports.

As seen in FIG. 3I, extension members 312 may extend into body 300 and may be attached to respective pivot 330. The pivot may keep one end of the extension members in place while allowing for rotation as the offset members 314 translate toward and away from one another.

To facilitate transitioning between configurations, wedge block 332 may be positioned between angled portions of the extension members. When wedge block 332 is pressed toward pivot 330, extension members 312 may be driven away from one another. When not pressed down, extension members 312 may preferentially return to the positions and orientations illustrated in FIG. 3I. While not shown in FIG. 3I, springs or other mechanism may be used to cause extension members to return when wedge block 332 is not used to apply force to extension members.

To apply force with wedge block 332, wedge block 332 may be mechanically coupled via coupling 303 to lock cylinder 302. When lock cylinder is rotated, coupling may move up or down depending on the rotation of lock cylinder. Wedge block 332 may move along with coupling 303.

Key 304 may facilitate rotation of lock cylinder 302. While not illustrated, lock cylinder 302 may include security pins and/or other types of security mechanisms that may prevent lock cylinder 302 from rotating unless key 304 is positioned in lock cylinder.

Turning to FIG. 3J, the reversible interference mechanism is illustrated in the first configuration which prevents insertion and removal of extension members from openings for ports.

As seen in FIG. 3J, rotation of key 304 may cause lock cylinder 302 to move coupling 303 downward which causes wedge block 332 to apply force to extension member 312, driven them apart. By doing so, offset members are translated away from one another and rotated about respective pivots (e.g., 330). Once so rotate, key 304 may be removed which may lock the security apparatus in this configuration.

Turning to FIGS. 3K-3L, diagrams of an actuator that rotates extension members are shown. In these figures, the internal components of the actuator are shown even though they may normally be obscured from view by body 300. In FIG. 3K, the reversible interference mechanism is illustrated in a second configuration which allows for insertion and removal of extension members from openings for ports.

As seen in FIG. 3K, extension members 312 may extend into body 300 and may be attached to respective extension gears (e.g. 352). The respective extension gear may be mechanically coupled to drive gear 350. Consequently, both extension members may be rotated about their length via rotation of drive gear 350.

To rotate drive gear 350, drive gear 350 may be mechanically coupled via coupling 303 to lock cylinder 302. When lock cylinder is rotated, coupling 303 cause drive gear 350 to correspondingly rotate. Consequently, rotation of lock cylinder 302 may cause extension members to rotate.

Key 304 may facilitate rotation of lock cylinder 302. While not illustrated, lock cylinder 302 may include security pins and/or other types of security mechanisms that may prevent lock cylinder 302 from rotating unless key 304 is positioned in lock cylinder.

Turning to FIG. 3L, the reversible interference mechanism is illustrated in the first configuration which prevents insertion and removal of extension members from openings for ports.

As seen in FIG. 3L, rotation of key 304 may cause lock cylinder 302 to rotate coupling 303 thereby causing drive gear 350, extension gear 350, and extension member 312 to rotate. By doing so, offset members are rotate away from one another. Once so rotate, key 304 may be removed which may lock the security apparatus in this configuration.

Thus, as illustrated in FIGS. 3A-3L, embodiments disclosed herein may provide for the security of data processing systems by limiting physical access to ports of the data processing systems. Physical access may be limited by locking physical structures in the openings that normally allow physical access to the ports.

When locked to a port, the security apparatus may also be used to reduce the susceptibility of a data processing system to theft, as noted above. To do so, the security apparatus may be reversibly anchored to other structures. For example, the security apparatus may be anchored to a table, a wall, and/or other type of physical structure. By doing so, the structure to which the security apparatus is anchored may need to be broken and/or moved along with the data processing system for the data processing system to be moved from a predetermined location (e.g., as part of a theft).

Figure 3M:
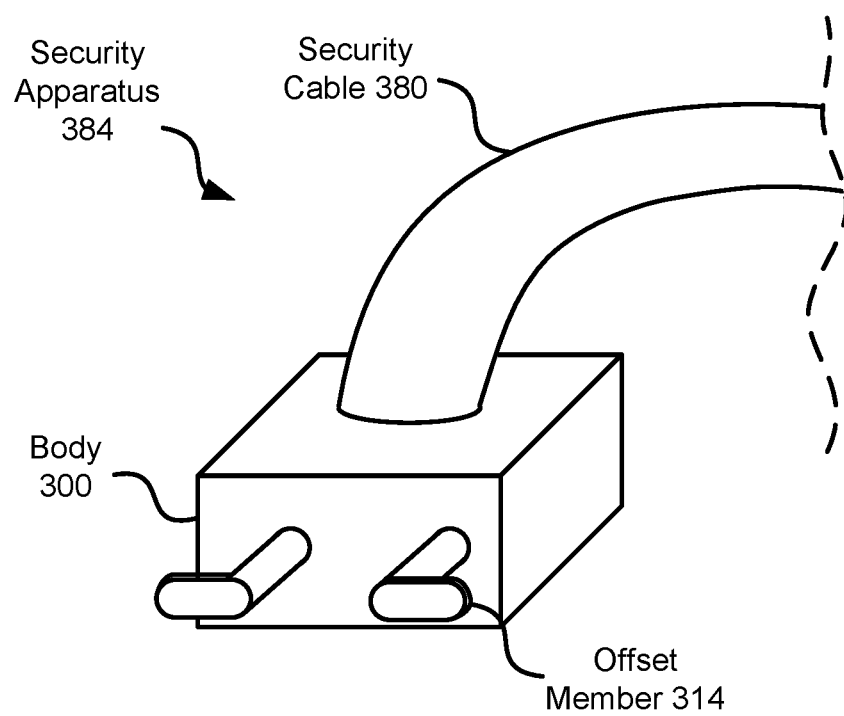
FIG. 3M shows a diagram illustrating a security apparatus with a security cable in accordance with an embodiment.

Turning to FIG. 3M, a diagram of a security apparatus 384 with security cable 380 in accordance with an embodiment is shown. Security apparatus 384 and security cable 380 may facilitate reversible anchoring of data processing systems to other structures (e.g., while security apparatus 384 is locked to the data processing systems).

Security cable 380 may be implemented with a physical structure such as a length of structural cable. The structural cable may be resistant to cutting or other types of damage. Security cable 380 may be implemented with other types of structure to facilitate reversible attachment of body 300 to other structures (e.g., which may limit movement of body 300 and/or a data processing system to which body 300 is attached).

Generally, security cable 380 may facilitate anchoring (and/or other types of reversible attachment) of security apparatus 384 to other structures. To do so, a first end as illustrated in FIG. 3M may be physically attached to body 300 or other portions of security apparatus. The second end of security cable 380 may be attached to a securing mechanism such as, for example, locking mechanisms, loops, and/or other types of structures that may allow for security cable 380 to be reversibly anchored to other structures.

Figure 3N:
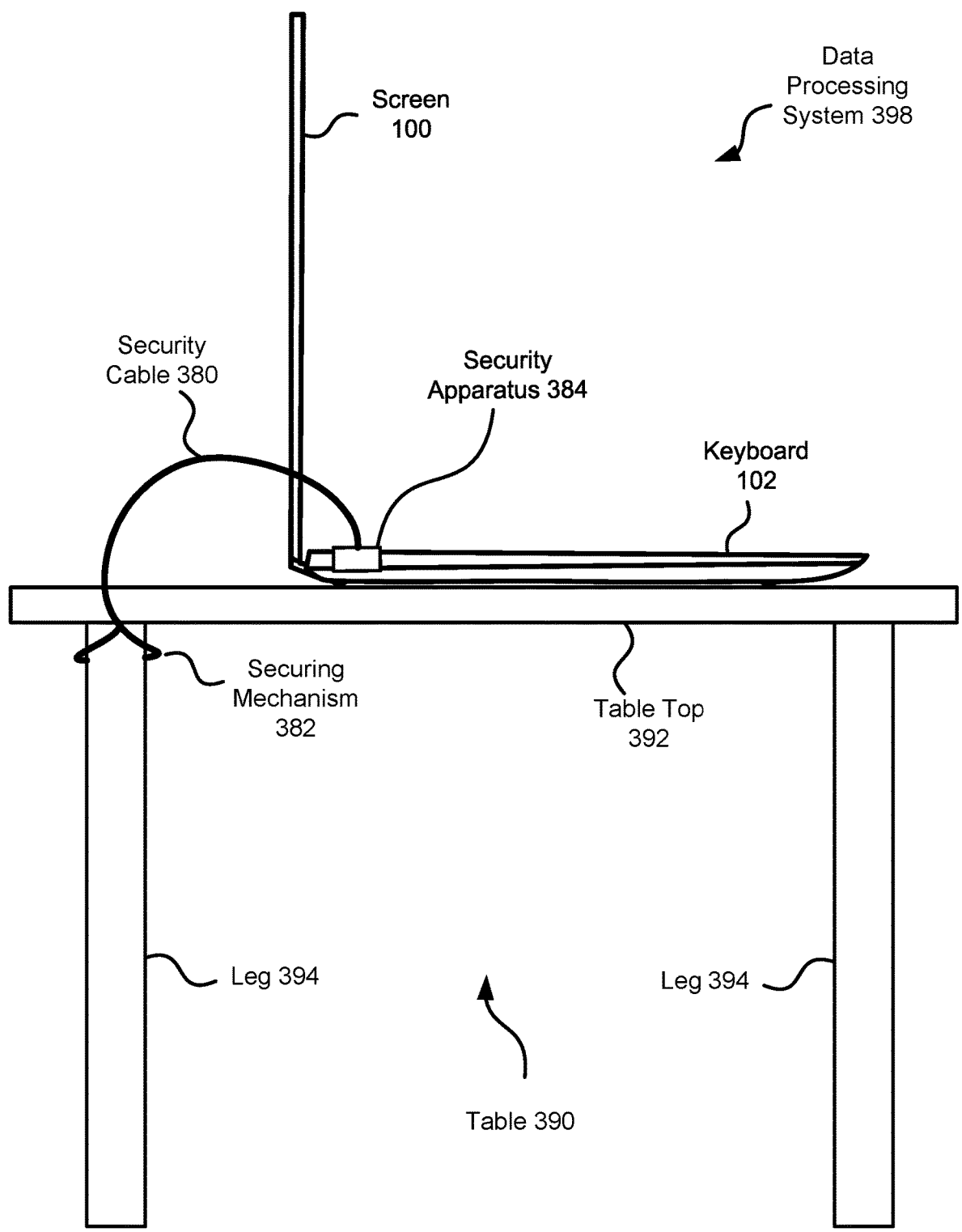
FIG. 3N shows a diagram illustrating a data processing system and security apparatus with a security cable positioned with a table in accordance with an embodiment.

Turning to FIG. 3N, a diagram of security apparatus 384 with security cable 380 attached to a data processing system 398 positioned with table 390 in accordance with an embodiment is shown. FIG. 3N may illustrate a side view of the data processing system illustrated in FIG. 1. In FIG. 3N, security apparatus 384 is locked to port 104 of the data processing system which is obscured from view in FIG. 3N.

To improve the resistance of data processing system 398 to theft, security cable 380 may be anchored to table 390 on which data processing system 398 is positioned for use. To anchor itself to table 390, securing mechanism 382 (e.g., attached to a second end of security cable 380) may be attached to a portion of table 390. In FIG. 3N, data processing system 398 is illustrated as positioned on table top 392 with security mechanism 382 being anchored to leg 398 of table 390.

For example, securing mechanism 382 may be implemented with a loop that may be wrapped around leg 394. When so wrapped, security mechanism 382 may be anchored to leg 394. Data processing system 398 may be similar anchored to table 390 through the attachment of security cable 380 and security apparatus 384.

Consequently, as seen in FIG. 3N, security apparatus 384 may facilitate reversible attachment of data processing system 398 to other structures thereby improving the resistance of data processing system 398 to theft.

While securing mechanism 382 is illustrate din FIG. 3N with a specific mechanism (e.g., a loop) for securing security cable 380 to other structures, securing mechanism 382 may be implemented with other types of structures without departing from embodiments disclosed herein. Additionally, while illustrated and described with respect to table 390, security apparatus 384 may facilitate reversible anchoring of data processing system 398 to other structures without departing from embodiments disclosed herein.

Figure 4:
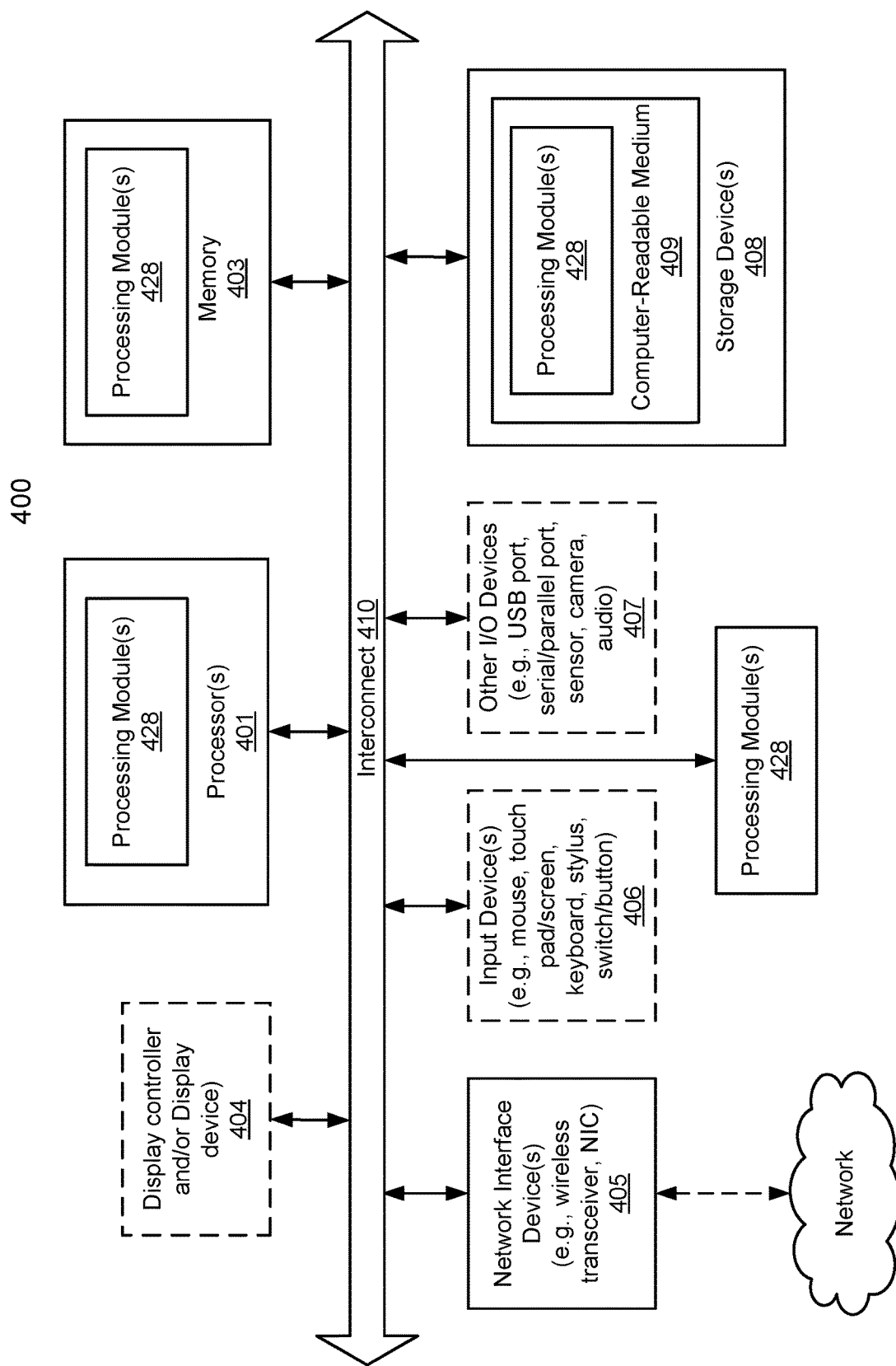
FIG. 4 shows a block diagram illustrating a computing device in accordance with an embodiment.

As discussed above, a data processing system may be implemented with one or more computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A security apparatus to secure a port on a computing device, comprising:
    a body;
    a reversible interference mechanism extending from the body; and
    an actuator, coupled to the reversible interference mechanism, adapted to actuate the reversible interference mechanism between two configurations, in a first of the two configurations the reversible interference mechanism has a cross section that allows a portion of the reversible interference mechanism to traverse through an opening of a type C universal serial bus port, in a second of the two configurations the reversible interference mechanism has a cross section that disallows the portion of the reversible interference mechanism from traversing through the opening of the type C universal serial bus port, and the body being locked to the type C universal serial bus port while the portion of the reversible interference mechanism is in the type C universal serial bus port and in the second of the two configurations.

2. The security apparatus of claim 1, wherein the reversible interference mechanism comprises:
    an extension member that extends away from the body; and
    an offset member positioned with an end of the extension member that is positioned away from the body, the offset member having a larger cross section than the extension member.

3. The security apparatus of claim 2, wherein the reversible interference mechanism comprises two pairs of the extension member and the offset member.

4. The security apparatus of claim 3, wherein each of the two pairs is separately coupled to the actuator.

5. The security apparatus of claim 3, wherein the actuator actuates the reversible interference mechanism by rotating the extension member of each of the two pairs about a length of the respective extension member.

6. The security apparatus of claim 5, wherein the offset member comprises a bar with a first end attached to the extension member and a second end that extends away from the length of the extension member.

7. The security apparatus of claim 6, wherein the extension member of each of the pairs is positioned with respect to one another so that both extension members of the pairs may traverse through the type C universal serial bus opening regardless of which of the two configurations the reversible interference mechanism is positioned.

8. The security apparatus of claim 3, wherein the actuator actuates the reversible interference mechanism by translating the extension member of each of the two pairs.

9. The security apparatus of claim 8, wherein the offset member comprises a bar with a first end attached to the extension member and a second end that extends away from a length of the extension member.

10. The security apparatus of claim 9, wherein the extension member of each of the pairs is positioned with respect to one another so that both extension members of the pairs may traverse through the type C universal serial bus opening while translated toward one another.

11. A data processing system, comprising:
    computing resources;
    a port through which the computing resources may be accessed; and
    a security apparatus comprising:
        a body;
        a reversible interference mechanism extending from the body; and
        an actuator, coupled to the reversible interference mechanism, adapted to actuate the reversible interference mechanism between two configurations, in a first of the two configurations the reversible interference mechanism has a cross section that allows a portion of the reversible interference mechanism to traverse through an opening of the port, in a second of the two configurations the reversible interference mechanism has a cross section that disallows the portion of the reversible interference mechanism from traversing through the port, and the body being locked to the port while the portion of the reversible interference mechanism is in the port and in the second of the two configurations.

12. The data processing system of claim 11, wherein the reversible interference mechanism comprises:
    an extension member that extends away from the body; and
    an offset member positioned with an end of the extension member that is positioned away from the body, the offset member having a larger cross section than the extension member,
    wherein the port is a type C universal serial bus port.

13. The data processing system of claim 12, wherein the reversible interference mechanism comprises two pairs of the extension member and the offset member.

14. The data processing system of claim 13, wherein each of the two pairs is separately coupled to the actuator.

15. The data processing system of claim 13, wherein the actuator actuates the reversible interference mechanism by rotating the extension member of each of the two pairs about a length of the respective extension member.

16. The data processing system of claim 15, wherein the offset member comprises a bar with a first end attached to the extension member and a second end that extends away from the length of the extension member.

17. The data processing system of claim 16, wherein the extension member of each of the pairs is positioned with respect to one another so that both extension members of the pairs may traverse through the type C universal serial bus opening regardless of which of the two configurations the reversible interference mechanism is positioned.

18. The data processing system of claim 13, wherein the actuator actuates the reversible interference mechanism by translating the extension member of each of the two pairs.

19. The data processing system of claim 18, wherein the offset member comprises a bar with a first end attached to the extension member and a second end that extends away from a length of the extension member.

20. The data processing system of claim 19, wherein the extension member of each of the pairs is positioned with respect to one another so that both extension members of the pairs may traverse through the type C universal serial bus opening while translated toward one another.

\* \* \* \* \*